Oct. 18, 1966       J. G. DRENNAN       3,279,581
BOTTLE METERING MECHANISM
Filed March 4, 1964       4 Sheets-Sheet 1
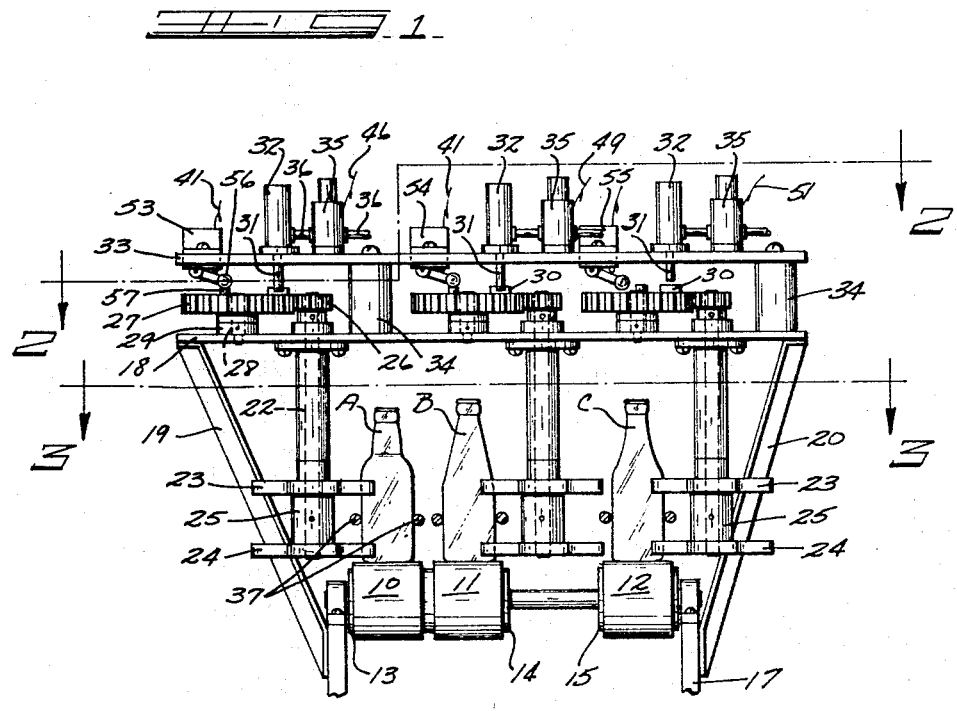
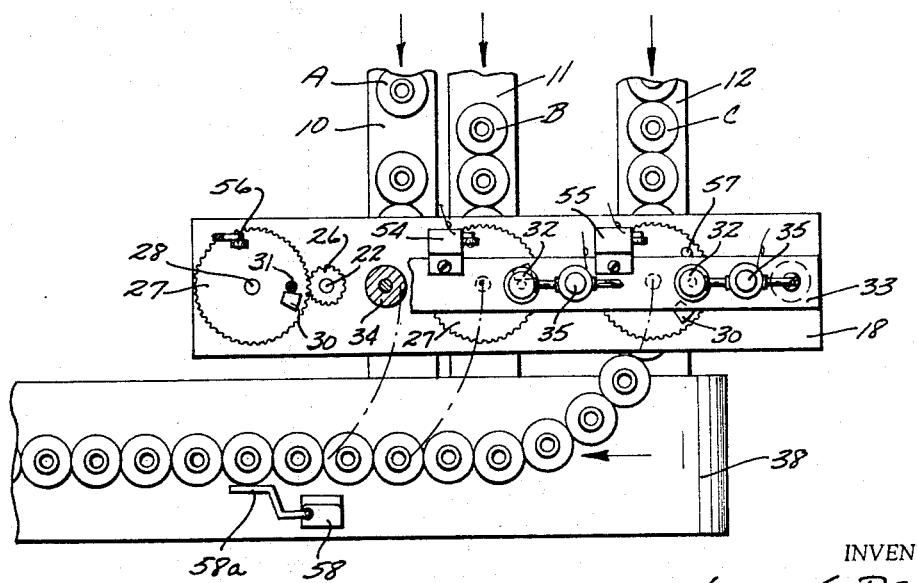
INVENTOR.
JAMES G. DRENNAN
BY
ATTORNEYS Oct. 18, 1966 J. G. DRENNAN 3,279,581
BOTTLE METERING MECHANISM
Filed March 4, 1964 4 Sheets-Sheet 2
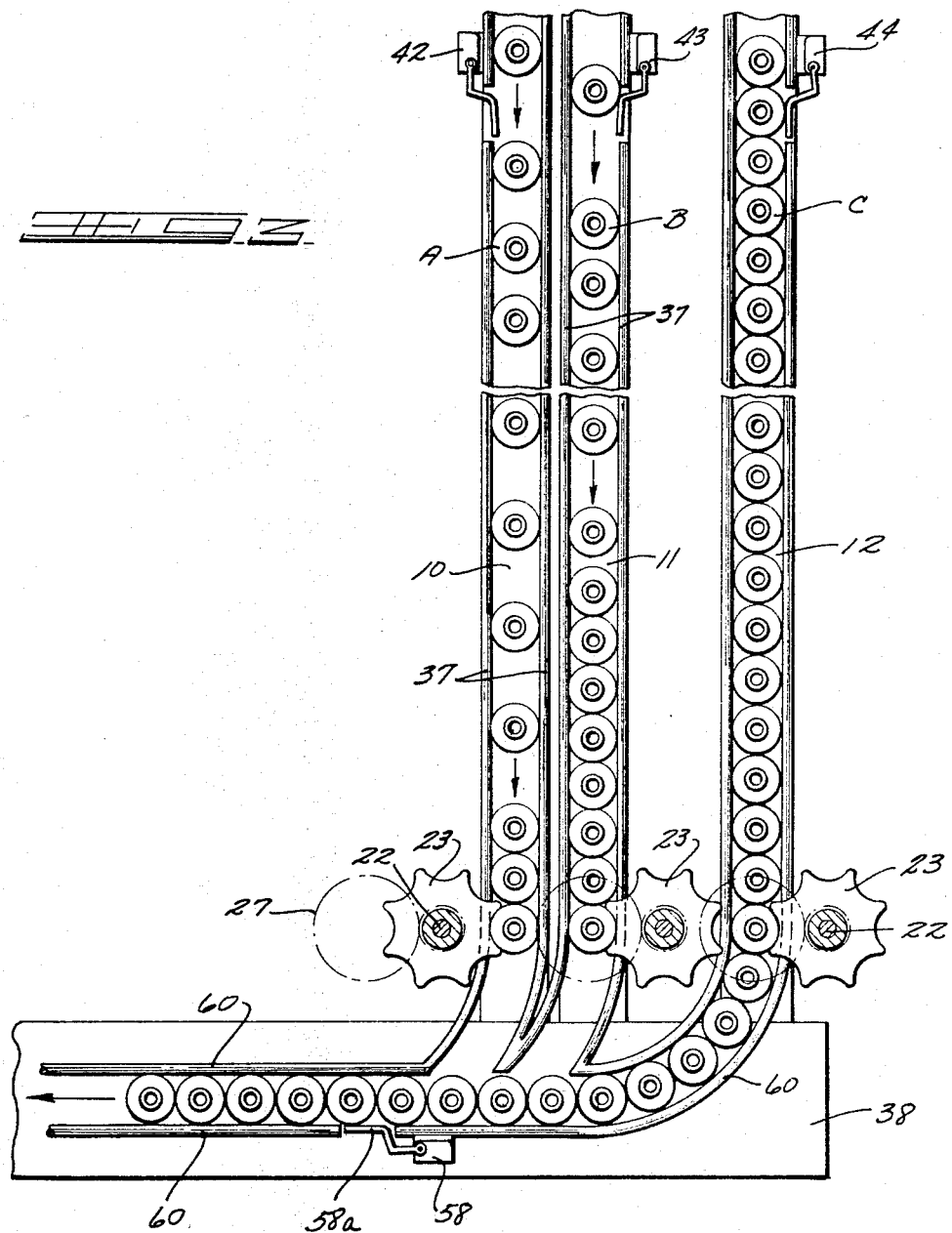
INVENTOR.
JAMES G. DRENNAN
BY
J. R. Nelson and
W. A. Schaich
ATTORNEYS

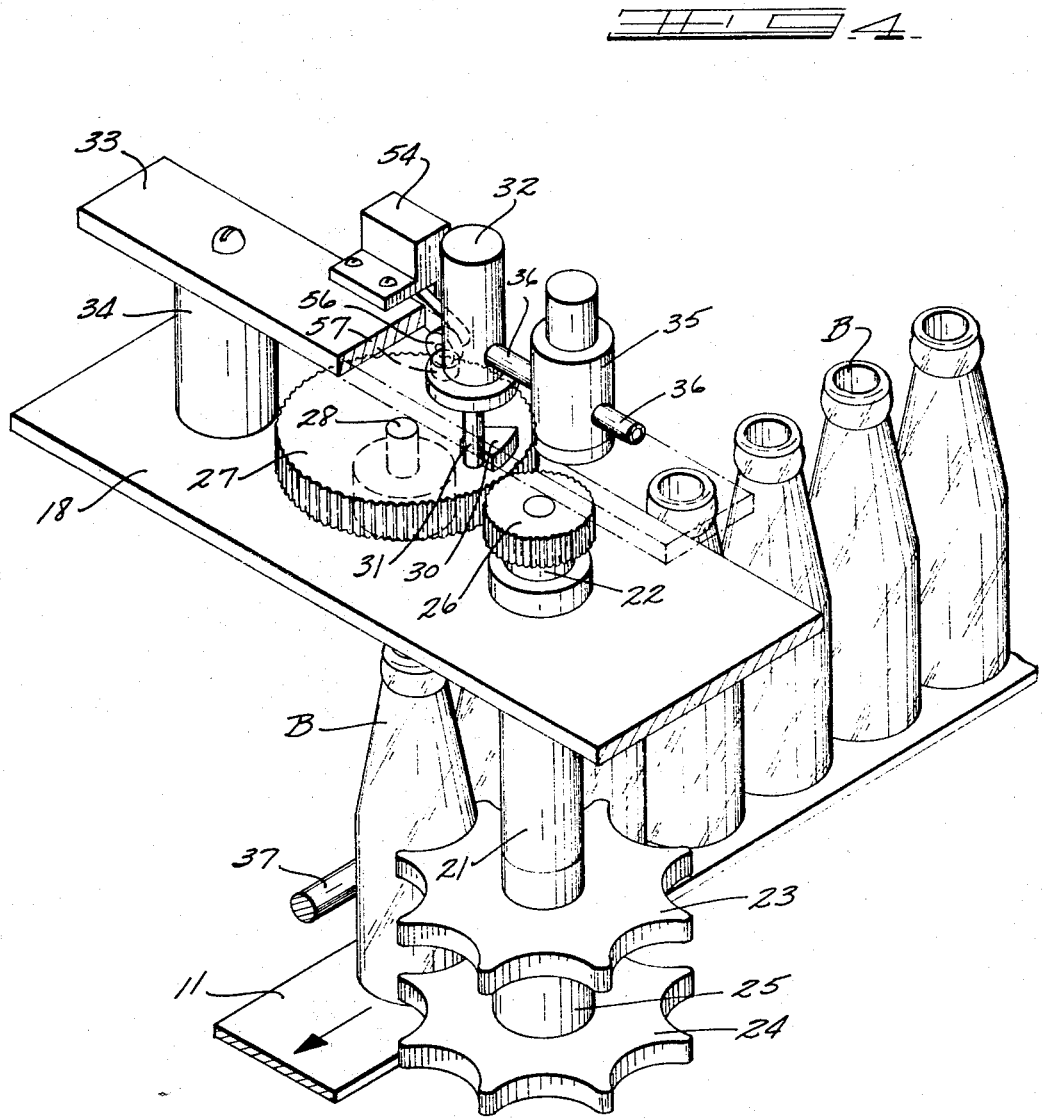

Oct. 18, 1966 J. G. DRENNAN 3,279,581
BOTTLE METERING MECHANISM
Filed March 4, 1964 4 Sheets-Sheet 4
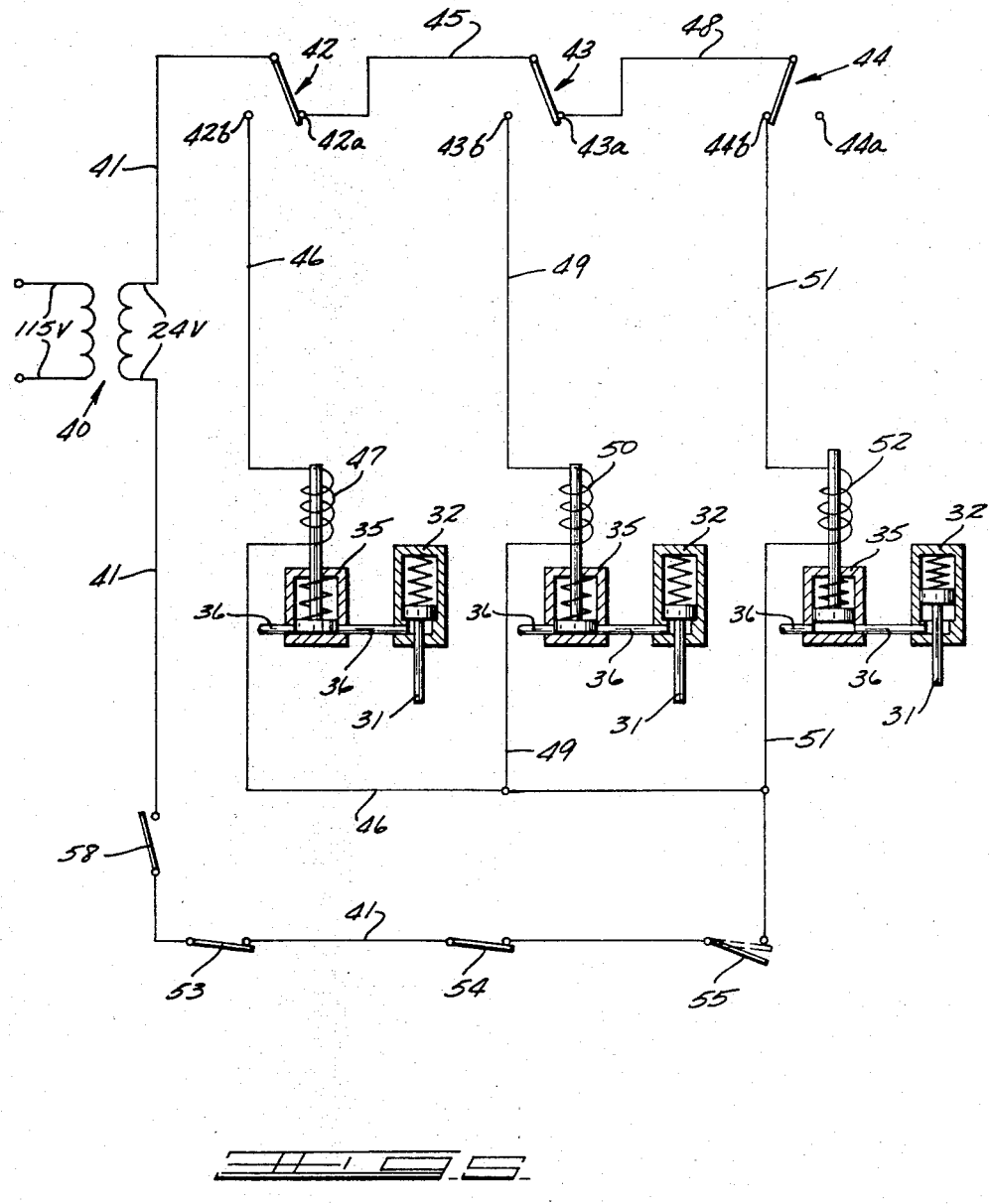
INVENTOR.
JAMES G. DRENNAN
BY
J. R. Nelson
and W. A. Church
ATTORNEYS

3,279,581
BOTTLE METERING MECHANISM
James G. Drennan, San Mateo, Calif., assignor to Owens-Illinois, Inc., a corporation of Ohio
Filed Mar. 4, 1964, Ser. No. 349,218
11 Claims. (Cl. 198—32)

The present invention relates to metering mechanism for use on conveyor lines feeding containers, such as bottles and the like, to various machines, such as case packing machines.

The metering mechanism may be used in conjunction with bottle sorting machinery in a bottling plant. The bottle sorting machine sorts random bottles of several different kinds, colors and shapes and places them on one of several individual conveyors. These conveyors are equipped with the present invention for the purpose of (1) feeding the more predominant or frequent kind of bottles undergoing sorting to the case packer and allowing only a predetermined build up of the line of containers on the sorting conveyors, and (2) automatically segregating and spacing a line of containers equal in number to a case load, usually consisting of twenty-four bottles, to be handled by a case packer in placing these sorted bottles in trays or cases for handling them.

It is the object of the present invention to provide an improved metering mechanism for handling containers on conveyors.

Another object of the invention is to provide a metering mechanism that is automatic in feeding predetermined arrays of containers to a machine for further handling.

A further object is to provide a metering system having a plurality of metering mechanisms which will automatically meter a predetermined number of bottles at intervals in time from the conveyors, working in predetermined order to maintain the accumulation of bottles on the conveyors under control.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a front elevational view of three of the metering mechanisms of the invention in conjunction with a bottle handling system for three types of sorted beverage bottles;

FIG. 2 is a plan sectional view of the apparatus taken along line 2—2 of FIG. 1;

FIG. 3 is a plan sectional view of the apparatus taken along line 3—3 of FIG. 1;

FIG. 4 is a perspective view of a single metering mechanism of the invention; and FIG. 5 is a schematic wiring diagram showing the control circuit for the invention for operating a three conveyor metering system.

As shown on FIGS. 1 and 2 of the drawings, three horizontal, parallel conveyors 10, 11 and 12 are mounted for endless movement about end pulleys 13, 14 and 15 on a horizontal end shaft 16 journaled in bearings on the frame 17. These conveyors 10, 11 and 12, each respectively receive different bottles sorted as to kind, such as bottle types A, B and C shown on the drawings. These may be received from a sorting machine, such as disclosed in my co-pending application, Serial No. 313,609, filed October 3, 1963. The frame 17 supports a superstructure 18 attached by angle brackets 19 and 20.

Depending from the superstructure over the respective conveyors 10, 11 and 12 are the individual metering mechanisms, each of which are constructed substantially alike, and are described as follows:

A vertical bearing support 21 is bolted in place at the underside of superstructure 18 and extends above the plate surface thereof. A vertical shaft 22 has an upper starwheel 23 and a lower starwheel 24 keyed thereon and separated by a spacer element 25 on the shaft. This assembly 23, 24, 25 comprises a starwheel unit. The starwheels 23, 24 are matched to have plural bottle or article receiving pockets and in the example shown on the drawings the starwheels each have eight of these pockets.

Keyed on the upper end of shaft 22 is a first spur gear 26 that is in mesh with a second spur gear 27, the latter being rotatably mounted by its stub shaft 28 in bearing boss 29 on the upper face of superstructure 18. The second gear 27 is constructed to include a stop means in the forms of the upstanding projection or lug 30. This stop means cooperates with the plunger 31 of a power-operated mechanism, which in the preferred form of the invention disclosed is a fluid-pressure operated cylinder-piston assembly 32. This assembly or power mechanism 32 is mounted in the proper alignment for plunger 31 to intercept lug 30 on an upper plate 33 bolted to the superstructure 18 and separated by the spacer supports 34. The cylinder 32 is connected through a solenoid-valve control 35 by a fluid line or conduit 36 and then to a source of fluid under pressure, such as compressed air. The cylinder assembly 32 is most advantageously made single acting with an upper internal spring element (FIG. 5) normally retaining the plunger 31 in a lower, extended position bearing against the lug 30 of the second gear and preventing its rotation in the direction of advancing containers on the conveyors by the starwheel units.

In the example shown, it is desirable in using the invention for sorting and casing beverage bottles to meter case or tray loads of bottles in successive arrays or groups of twenty-four. By having the starwheel 23, 24 provided with eight pockets, a group of twenty-four bottles is metered by a complete revolution of the second gear 27 where the gears 27 and 26 have a pitch diameter ratio or gear ratio of 3 to 1. Thus, for every revolution of gear 27, gear 26 will rotate through three revolutions, and in so doing, the starwheel 24, 25 will pass twenty-four pockets (bottles).

The starwheel is arranged along the conveyor it serves in relation to a guide means to provide in effect a metering gate so that all bottles on the conveyor must pass through the starwheel to advance farther downstream on the conveyor. This guide means takes the form of guide rails 37 supported by suitable means (not shown) along the path of the conveyors 10, 11 and 12. Rails 37 guide the bottles into the pockets of the starwheels 23, 24, the latter receiving the bottles and passing them beyond the gate only upon rotation of the starwheel mechanism.

The control for the metering gates in the present invention provides for automatic operation of the gates in metering a case load of bottles from one conveyor at a time onto the discharge conveyor 38. The discharge conveyor 38 extends to the other machinery, e.g. the case packer, for further handling the bottles after metering them into case lots. The control circuit, as shown on FIG. 5, provides for feeding bottles from the conveyors 10, 11 or 12 after a line of bottles has backed up on one or more of these conveyors a predetermined distance. This distance is selected as something greater than a span to support a metered lot of articles, such as a case lot of twenty-four bottles. The control circuit includes a source of electrical current at transformer 40 connected to a 115 volt line source of A.C. current. For safety sake, transformer 40 is preferably of relatively low voltage, such as 24 volts, at its secondary output connected into the circuit 41. Mounted along the conveyors 10, 11 and 12, respectively, at preselected locations are single pole, double throw switches 42, 43 and 44. These switches are normally set in the position of switches 42 and 43 shown on FIG. 5. Whenever articles are accumulated behind the starwheel gate, such as shown on conveyor 12 of FIG. 3, the actuator of switch 44 is biased by the articles to shift the switch to the alternate position.

The circuit 41 is connected to the throw of switch 42 which is normally set to connect to the pole 42a that includes wire 45 connected to the throw of switch 43. The other pole 42b of the switch 42 is individual in the gate circuit 46 with the solenoid coil 47. The switch 43 is normally set to have its throw connected to the pole 43a which is connected with the wire 48. The other pole 43b of switch 43 is individual in the circuit 49 with the solenoid coil 50, which is connected to the wire 46. The switch 44 is normally set to have its throw connected to the open pole 44a, but, as is shown in the example on the drawings, the accumulated line of bottles on conveyor 12 (which exceeds a case lot of twenty-four) is backed up to actuate switch 44 so that the throw is connected to the other pole 44b individual in the circuit 51 with solenoid coil 52. The circuit 51 is joined with circuits 46 and 49. The above control circuit permits operation of only one of the metering gates at one time. The described control circuit further provides a preference of metering operation by certain of the conveyors over others. The metering circuit of switch 42 takes preference over switches 43 and 44, and switch 43 takes preference over switch 44. For example, if bottles are backed up on conveyor 12 sufficiently to close switch 44, but at the same time bottles have backed up on conveyor 10 sufficiently to close switch 42, the bottles on conveyor 10 will be metered first until switch 42 again opens the metering circuit of solenoid 47.

In the circuit 41 are also included normally closed switch means operable in response to actuation of any of the gate circuits, said means being made up of switches 53, 54 and 55. These switches are constructed similarly and are spring opened switches closable by the actuation of the roller-lever 56. The switches 53-55 are each held normally closed by means of the cam lug 57 on each of the gears 27 actuating roller-levers 56. The lug 57 on each of these gears is located so that it will close the switch, when the lug 30 is against the plunger 31. In response to the actuation of any of the metering gates, i.e. the rotation of the particular starwheel unit 23, 24, the gear 27 will rotate and move cam lug 57 from beneath switch roller 56 and the switch will be opened. This will break (open) the circuit 41 and deenergize the particular solenoid (47, 50 or 52). Thus, in response to the actuation of any circuit of the metering gates, a means is operated to open the switch means in the common circuit connection to the solenoids and interrupt the connection for a predetermined period.

Of course, whenever any of the solenoids 47, 50 or 52 are energized they open their respective valve 35 and connect fluid pressure to that cylinder 32 thereby overcoming the spring that normally maintains its plunger 31 extended in stopping engagement with lug 30 of the gear 27.

As shown on FIG. 5, if for example the bottles back up to operate switch 44, solenoid 52 is energized because at that instant switch 55 is still closed (dotted outline). But, after the plunger 31 of the metering mechanism for conveyor 12 is lifted, the gears 27, 26 and starwheel unit 23, 24 are free to rotate under forward pressure supplied by bottles on the conveyor. As soon as the corresponding gear 27 and its cam lug 57 are rotated, the switch 55 will open and break the circuit that has energized solenoid 52. Thereafter, its plunger 31 will again be extended and in position to engage lug 30 of the gear 27 when it completes one revolution. During this one revolution of gear 27, gear 26 will rotate through three revolutions as will the starwheel unit 23, 24. This will meter twenty-four bottles past the metering gate.

As shown on FIGS. 2 and 3, the metered bottles may be received by a discharge conveyor 38 and a system of guide rails 60 mounted over this conveyor to guide metered bottles along a desired path on conveyor 38. Mounted stationary on the guide rails 60 in a preselected location spaced beyond the metering gates is a conveyor flow switch means which comprises a normally-closed switch 58 connected in the power supply circuit 41. The function of the conveyor flow switch means is to insure all bottles are past a preselected point before any of the metering gates can release another lot of bottles. The switch 58 has a spring loaded actuator 58a normally closing it and extending into the path of the bottles in the guide 60. As the bottles are metered from any conveyor into the discharge conveyor and the first of the procession of a metered lot engages switch actuator 58a, the power supply circuit 41 is opened and remains so until the bottles of the metered group have all cleared the switch 58. This provides a minimum delay of desired duration between metered groups of bottles to enable the machinery receiving them to do its function.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. An article metering apparatus of the class described comprising a conveyor driven in one direction, a starwheel gate having a predetermined number of article receiving pockets, means mounting the starwheel for rotation over the conveyor and for advancing the pockets of the starwheel in the direction of the conveyor, said means comprising a rotatable shaft, a guide means opposite the starwheel for guiding articles on the conveyor in seriatim fashion into engagement with the pockets of the starwheel, a first gear on said shaft, a second gear rotatably mounted and in mesh with the first gear, said first and second gears being of a predetermined gear-ratio for advancing a predetermined plural number of article receiving pockets of the starwheel for every revolution of said second gear, stop means on said second gear, and a retractable member normally engaging said stop means on the second gear preventing rotation of said starwheel in the direction of the conveyor, and retractable to permit a rotation of the starwheel in that direction.

2. The apparatus of claim 1, including a reciprocating power-operated means connected to said retractable member for retracting the latter to permit at least one revolution of said second gear, and control means connected to operate said power means responsive to the presence of a predetermined number of articles on said conveyor upstream of said starwheel.

3. An article metering apparatus of the class described comprising a conveyor driven in one direction, a starwheel gate having a predetermined number of article receiving pockets, means mounting the starwheel for rotation over the conveyor and for advancing the pockets of the starwheel in the direction of the conveyor, said means comprising a rotatable shaft, a guide means opposite the starwheel for guiding articles on the conveyor in seriatim fashion into engagement with the pockets of the starwheel, means operatively connected to said shaft preventing rotation thereof in the starwheel advancing direction, and control means operated by a predetermined line of articles on the conveyor behind the starwheel gate, and means connected to said last-mentioned means operated by the control means permitting a predetermined roation of said shaft for advancing a predetermined number of article receiving pockets of the starwheel, thereby metering an array of a corresponding predetermined number of articles through the starwheel gate.

4. A combination for metering plural articles into a predetermined array comprising plural conveyors each receiving articles and advancing them toward a stationary metering device individual to each conveyor, each metering device comprising a shaft, a pocketed starwheel on said shaft, a frame rotatably mounting said shaft over its said conveyor for the articles thereon engaging the starwheel, guide means opposite the starwheel for guiding articles on the conveyor into engagement with said starwheel, stop means mounted on said frame and connected to said starwheel normally preventing advancing rotation thereof whereby the said guide means and starwheel provides an article gate on said conveyor, and power-operated means connected to said stop means to render the latter ineffective for a predetermined rotational displacement of said starwheel, control means operated in response to a line of articles of predetermined length on said conveyors for actuating the power-operated means of said metering device thereof, the power-operated means of said metering devices being collectively connected to said control means, the latter including stationary switch devices mounted at a predetermined position upstream on each of said conveyors and operated in response to a compacted line of articles thereon.

5. In combination, plural conveyors and a complementary plurality of article metering gates, the conveyors each receiving articles and advancing them toward a metering gate individual thereto, each said gate comprising a plural pocketed starwheel, a shaft rotatably mounting the starwheel over the conveyor to engage the articles by said pockets and a guide for moving the articles into engagement with a pocket of the starwheel, a first gear on the shaft, a second gear rotatably mounted and in mesh with the first gear, a lug on said second gear and a reciprocating, electrically controlled mechanism mounted to engage said lug, said mechanism being normally extended for engagement with said lug preventing forward rotation of the starwheel gate, an electrical source, means connecting the mechanisms in parallel circuits with said source, normally-open switch means connected in said parallel circuits and mounted along the plural conveyors a predetermined distance ahead of the metering gates, the switch means being closable by an accumulation of articles backing up on at least one of said conveyors, and switch means in series circuit with said source and said parallel circuits normally closed and operated in response to rotation of the second gears to open the said circuits.

6. In combination, plural conveyors and a complementary plurality of metering gates, the conveyors each receiving articles and advancing them toward a metering gate individual thereto, each said gate comprising a plural pocketed starwheel, a shaft rotatably mounting the starwheel over the conveyor to engage the articles by said pockets and a guide for moving the articles into engagement with a pocket of the starwheel, a first gear on the shaft, a second gear rotatably mounted and in mesh with the first gear, a lug on said second gear and a reciprocating, electrically controlled mechanism mounted to engage said lug, said mechanism being normally extended for engagement with said lug preventing forward rotation of the starwheel gate, a control means for all of said mechanisms comprising an electrical source, means connecting each said mechanism and said source for individually electrically energizing said mechanisms and including switch means disposed upstream on each said conveyor a predetermined distance from said gate, said switch means normally disconnecting its said mechanism and said source and operable to connect same by articles that accumulate upstream of said gate and engage said switch means, said switch means operated to connect one of said mechanisms and said source simultaneously disenabling the connection of any of the other mechanisms and said source.

7. The combination defined in claim 6, including a switch for each metering gate and connected in series with said switch means and said source, each of said switches being normally closed when the second gear of its said gate is stationary and opened upon rotary movement of the said second gear of its said gate, the actuation of a switch means on one of said conveyors by articles thereon causing the electrically controlled mechanism of the metering gate thereof to disengage the lug of the second gear thereof and initiate rotation of said second gear, whereupon the gear operated switch is opened, said mechanism returning to extended position for engagement with its said lug by a complete revolution of said second gear.

8. In combination, plural conveyors operated for advancing articles, plural electrically operated metering gates corresponding to the conveyors, means mounting one of said gates at a preselected location along each of said conveyors for controlling forward movement of articles thereby beyond each said location, and a control circuit for said metering gates comprising a source of current, a circuit individual to each gate, a first switch operable for connecting and disconnecting said source to a first gate circuit, a second switch connected between said first switch and a second gate circuit, operable for connecting said source to said second gate when said first switch is in disconnecting position with relation to said first gate circuit, a common connection to said gate circuits, normally closed switch means interposed in said common connection, and means operable in response to the actuation of any gate circuit for opening said switch means and interrupting said common connection for a predetermined period.

9. The combination of claim 8, wherein said circuit includes a third switch connected between said second switch and a third gate circuit, operable to connect said source to said third gate circuit when said first and second switches are in disconnecting position with relation to their respective gate circuits.

10. The combination of claim 8, wherein the metering gates each include a rotary element movable through at least one revolution upon actuation of the said gate circuit corresponding thereto, and said last-named means includes a cam device on said element normally closing said switch means and opening said switch means during each revolution of movement of said rotary element, whereby its metering gate is operated for metering a predetermined number of articles through it on its conveyor.

11. The combination defined in claim 8, wherein is included a second normally closed switch means interposed in said common connection and has means operated in response to a metered group of articles passing beyond said metering gates for opening said second switch means and interrupting said common connection until the metered group of articles pass the said means operating the second normally closed switch means.

References Cited by the Examiner
UNITED STATES PATENTS 1,281,579  10/1918  Johnson _____ 198—21

EVON C. BLUNK, *Primary Examiner.*

WILLIAM B. LA BORDE, *Examiner.*

R. E. AEGERTER, *Assistant Examiner.*